UNITED STATES PATENT OFFICE.

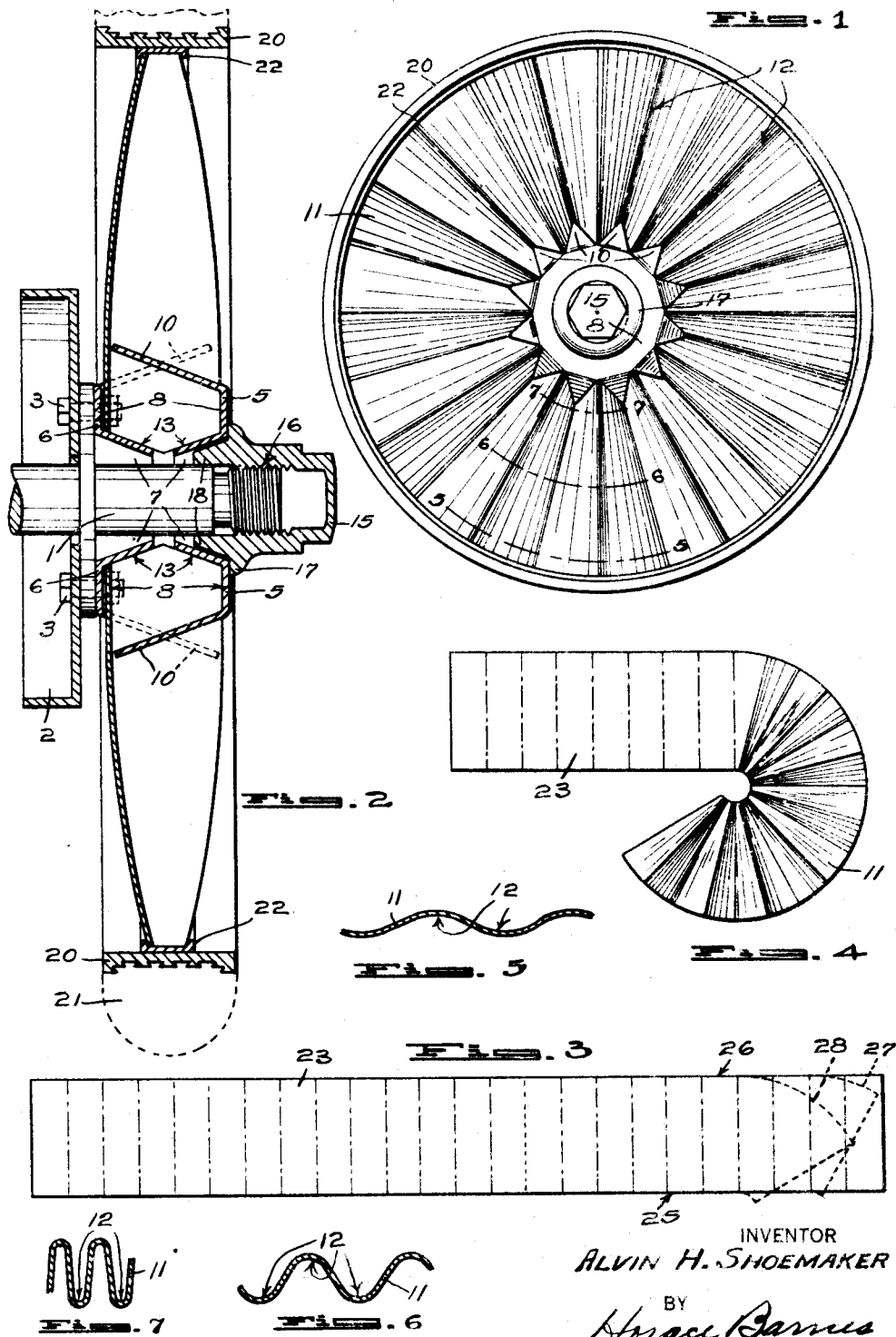

ALVIN H. SHOEMAKER, OF SEATTLE, WASHINGTON, ASSIGNOR TO KNAPPEN FINANCE COMPANY, OF SEATTLE, WASHINGTON, A CORPORATION OF WASHINGTON.

WHEEL.

1,379,054.      Specification of Letters Patent.      Patented May 24, 1921.

Application filed July 8, 1918. Serial No. 243,963.

*To all whom it may concern:*

Be it known that I, ALVIN H. SHOEMAKER, a citizen of the United States, and resident of Seattle, county of King, and State of Washington, have invented certain new and useful Improvements in Wheels, of which the following is a clear and exact specification.

This invention relates to improvements in automobile wheels, and more particularly to improvements in the type of wheel illustrated and described in my prior patent application Serial No. 218,608, filed February 15, 1918.

The object of the present improvements is the provision of a wheel of simple and strong construction particularly adapted for service on automobile trucks and for other heavy duties.

The invention consists in the novel construction of an automobile wheel, as will be fully described in the following specification, illustrated in the accompanying drawings and finally set forth in the appended claims.

Referring to said drawings, Figure 1 is a view in front elevation of a wheel constructed in accordance with my invention. Fig. 2 is a diametrical cross section on an enlarged scale of the same. Fig. 3 is a plan view of the blank from which the wheel web is formed illustrating in broken lines the manner of crimping the blank in the formation of a circular web. Fig. 4 is a similar view of the blank when partially formed. Figs. 5, 6 and 7 are cross sectional views of the web taken on lines 5—5, 6—6 and 7—7, respectively, on Fig. 1.

Referring to said views, the reference numeral 1 indicates the wheel hub mounted upon the rear axle of an automobile and 2 a brake drum secured thereto by bolts 3. The hub herein illustrated is the standard Ford rear hub, but it will be evident that any other suitable form of rear or front hub may be utilized. Numerals 5 and 6 indicate respectively front and rear side plates formed of pressed steel and of similar construction. Each plate consists of a conical flange 7 about a central aperture through which the hub extends; a plane portion 8 normally parallel with radial lines at right angles to the hub axis and terminating at its periphery in star-points 10 bent inwardly at angles to engage between the convolutions of the spoke-web 11.

The web structure 11 is formed preferably from a single flat sheet of metal. The blank is originally, as shown in Fig. 3, a rectangular sheet of metal which by successive bending operations in suitable dies is crimped into a circular web structure. The details of the formation of the web constitute a novel method and will be more particularly described hereinafter.

The blank when fully formed into the circular spoke-web structure has its opposite extremities united together by electric welding or other suitable process and then consists in an integral circular web of radial convolutions having oppositely disposed alternate angular recesses 12 upon each side into which the star points 10 engage.

The web is formed with a central aperture and hub opening. The edges of said hub opening are beveled from each side at corresponding angles, as at 13, which beveled faces are arranged to be engaged by the conical flanges 7 of the respective side plates 5 and 6. The rear face plate 6 is secured in any suitable manner, as by being bolted to the hub by the brake-retaining bolts 3 and the front face plate 5 is secured in opposite relation against the outer face of the web by means of a hub cap 15.

Said hub cap is provided with internal screw threads 16 engaging with coöperating screw threads upon the hub and is formed with a bearing flange 17 arranged to engage and exert pressure upon the plane portion 8 of the face plate 5, and is further formed with a conical projection 18 arranged to extend within the conical opening of said face plate to assist in centering the latter.

20 indicates a steel tire rim upon which a solid or other suitable truck tire 21 is mounted and 22 designates an angular channel secured to said rim thus forming a recess into which the outer periphery of the spoke-web interfits. The channel 22 may be formed integral with the rim if desired.

When assembled in the manner illustrated and described the hub cap is screwed inwardly to cause the bearing flange 17 to engage the face plate 5 and force the latter inwardly and will at the same time, in effect, draw outwardly the inner face plate 6 which is secured to the hub, thus causing an approximately equal wedge action by both the conical flanges 7 against the bevel surfaces 13 of the web and expanding the latter outwardly and evenly against the channel 22. The central pressure thus exerted unites all the parts in secure operative condition.

To remove the tire rim the hub cap 15 is unscrewed sufficiently to allow the web to contract to its normal position and to allow the channel 22 to pass over the outer periphery of the web, whereupon the tire rim may be removed from the spoke web or wheel center.

Referring to the novel method of forming the spoke-web, it will be seen that the blank, indicated at 23 in Fig. 3, is of rectangular configuration, consisting in a sheet of approximately 75 inches in length by 11 inches in width. This blank is fed into a press provided with a bending die (not shown), which at each downward stroke will form one complete angular convolution. Said die is formed to press deeper into the material upon the lower edge 25 which, in the completed web extends about the central or hub aperture, to thereby fold the same into relatively deep and close convolutions, somewhat as indicated in Fig. 7 and causing said lower edge 25 to contract to a greater extent than toward the opposite edge 26, where the convolutions are relatively shallow, as indicated in Fig. 5, which edge 26 will finally form the outer periphery of the web. The first stroke of the press will result in a bending of the material in a circular direction, as indicated in broken lines 27. The blank is then further fed into the press for the second bending stroke to form a second adjoining, similar convolution, resulting in a further circular bending of the blank, somewhat as indicated by broken lines at 28 in Fig. 3. Such bending operations are repeated by successive strokes of the press, a medial stage of the operation being indicated in Fig. 4, until the entire blank is fed into the press and the metal has been crimped into circular form, whereupon the opposite extremities of the web are united by electric or other welding operations to form an integral circular structure.

The web thus formed is characterized by a concentration of metal crimped into angular relation at the hub with relatively deep recesses whose radial convolutions taper with gradually shallower recesses, the fragmentary cross sections being approximately illustrated in Figs. 5, 6 and 7.

It will be seen that in the illustrations given that approximately 75 inches of metal is concentrated about the central opening, which opening may be of about five inches in diameter, while the same amount of metal is included in the convolutions at the rim, thus affording great strength and resistance to side thrust about the hub while affording a measure of flexibility at the rim.

It is evident that the web may be made of two or more segments if desired, although it is thought that the best results will be obtained by forming the web of a single sheet in the manner described. Also that the wheel formed in the manner described may be utilized for vehicle wheels of all descriptions although it is thought that it is particularly adapted for automobile truck wheels where heavy service is required.

What I claim is—

1. In a wheel, a rim, a sheet steel web connecting the hub and rim of the wheel, formed with radial convolutions which are of greater depth adjacent the hub and tapering to shallower depths at its periphery and means for radially expanding said web.

2. In a wheel, a web connecting the hub and rim of the wheel formed of a single sheet of metal having a relatively wide bearing adjacent the hub and a bearing reduced in width at its connection with the rim and means for securing the rim upon the web by expanding the web.

3. In a wheel, a circular spoke-web formed of a rectangular sheet of metal having folds extending across the sheet which folds are deeper upon one side than upon the other whereby the successive folds will cause said sheet to assume a circular configuration, a hub having conical expanding members, and means for securing said parts together by the expansive action of said conical expanding members.

4. In a wheel, a hub, a plate having a conical flange movable upon said hub, a hub-cap screw-threaded upon said hub and arranged to actuate said plate upon said hub, a tire rim, and an expansible sheet metal web connecting said hub and the rim and secured to each by the expansive action produced by forcing the said conical flange into the hub opening in said plate.

Signed at Seattle, Washington, this 2nd day of May, A. D. 1918.

ALVIN H. SHOEMAKER.